United States Patent [19]

Deller et al.

[11] Patent Number: 5,776,240
[45] Date of Patent: Jul. 7, 1998

[54] GRANULES BASED ON PYROGENICALLY PREPARED SILICON DIOXIDE, METHODS FOR THEIR PREPARATION AND USE THEREOF

[75] Inventors: Klaus Deller, Hainburg; Helmfried Krause, Rodenbach; Juergen Meyer, Rheinfelden, all of Germany; Dieter Kerner, Midland Park, N.J.; Hans Lansink-Rotgerink, Glattbach; Werner Hartmann, Babenhausen, both of Germany

[73] Assignee: Degussa Aktiengesellschaft, Frankfurt, Germany

[21] Appl. No.: 597,893

[22] Filed: Feb. 5, 1996

[30] Foreign Application Priority Data

Feb. 4, 1995 [DE] Germany .......... 195 03 717.0
Jan. 17, 1996 [DE] Germany .......... 196 01 415.8

[51] Int. Cl.[6] .................................................. C04B 14/04
[52] U.S. Cl. .......... 106/482; 106/485; 106/487; 106/490; 106/491; 423/335; 423/336; 423/337; 501/54; 502/439; 522/189; 526/352
[58] Field of Search .......... 106/482, 485, 106/487, 490, 491; 423/335, 336, 337; 501/54; 502/439; 522/189; 526/352

[56] References Cited

U.S. PATENT DOCUMENTS

| 2,993,809 | 7/1961 | Bueche et al. ...... 427/220 |
| 4,981,659 | 1/1991 | Chuang et al. ...... 423/235 |
| 4,985,477 | 1/1991 | Collins et al. ...... 106/490 |
| 5,372,795 | 12/1994 | Mulhofer et al. ...... 106/490 |
| 5,472,493 | 12/1995 | Regan ...... 106/490 |
| 5,480,626 | 1/1996 | Klasen et al. ...... 423/449.1 |
| 5,597,665 | 1/1997 | Wagner et al. ...... 502/104 |

FOREIGN PATENT DOCUMENTS

| 0 050 902 | 5/1982 | European Pat. Off. |
| 0 241 647 | 10/1987 | European Pat. Off. |
| 12 09 108 | 5/1969 | Germany |
| 28 31 508 | 2/1979 | Germany |
| 36 11 449 | 10/1987 | Germany |

OTHER PUBLICATIONS

Derwent Abstract No. 85-222 307/36, of SU 1139-701-A (May 1983).

*Primary Examiner*—Mark L. Bell
*Assistant Examiner*—Scott L. Hertzog
*Attorney, Agent, or Firm*—Beveridge, DeGrandi, Weilacher & Young, L.L.P.

[57] ABSTRACT

Granules based on silicon dioxide and having the properties:
Average particle size: 10 to 120 μm
BET surface area: 40 to 400 $m^2/g$
Pore volume: 0.5 to 2.5 ml/g
Pore size distribution: less than 5% of the total pore volume exists of pores with a diameter<5 nm, remainder are meso- and macropores
pH value: 3.6 to 8.5
Tapped density: 220 to 700 g/l
They are prepared by dispersing silicon dioxide in water, spray drying, and optionally heating and/or silanizing. The granules can be used as catalyst supports.

16 Claims, 4 Drawing Sheets

| | 1 | 1.5 | 2 | 3 | 4 | 6 | 8 | 12 | 16 | 24 | 32 | 48 | 64 | 96 | 128 | [μm] |
|---|---|---|---|---|---|---|---|---|---|---|---|---|---|---|---|---|
| Example 1 | 0 | 0 | 0 | 0.4 | 2 | 6 | 9 | 13 | 13 | 16 | 34 | 72 | 97 | 100 | 100 | [%] |
| Example 2 | 1 | 2 | 3 | 4 | 5 | 6 | 8 | 19 | 27 | 39 | 51 | 96 | 97 | 98 | 100 | [%] |
| Example 3 | 0.4 | 0.6 | 0.8 | 2 | 3 | 3 | 3 | 4 | 5 | 5 | 8 | 25 | 47 | 89 | 100 | [%] |
| Example 4 | 2 | 2 | 2 | 2 | 2 | 2 | 2 | 3 | 3 | 4 | 11 | 44 | 74 | 100 | 100 | [%] |

| particle size | 1 | 1.5 | 2 | 3 | 4 | 6 | 8 | 12 | 16 | 24 | 32 | 48 | 64 | 96 | 128 | [μm] |
|---|---|---|---|---|---|---|---|---|---|---|---|---|---|---|---|---|
| Example 1 | 0 | 0 | 0 | 0.4 | 2 | 6 | 9 | 13 | 13 | 16 | 34 | 72 | 97 | 100 | 100 | [%] |
| Example 2 | 1 | 2 | 3 | 4 | 5 | 6 | 8 | 19 | 27 | 39 | 51 | 96 | 97 | 98 | 100 | [%] |
| Example 3 | 0.4 | 0.6 | 0.8 | 2 | 3 | 3 | 3 | 4 | 5 | 5 | 8 | 25 | 47 | 89 | 100 | [%] |
| Example 4 | 2 | 2 | 2 | 2 | 2 | 2 | 2 | 3 | 3 | 4 | 11 | 44 | 74 | 100 | 100 | [%] |

| | 1 | 1.5 | 2 | 3 | 4 | 6 | 8 | 12 | 16 | 24 | 32 | 48 | 64 | 96 | 128 | [μm] |
|---|---|---|---|---|---|---|---|---|---|---|---|---|---|---|---|---|
| Example 5 | 1 | 2 | 2 | 3 | 4 | 6 | 8 | 11 | 15 | 22 | 35 | 70 | 97 | 100 | 100 | [%] |
| Example 6 | 0 | 0 | 0 | 0 | 0.9 | 5 | 8 | 15 | 20 | 34 | 50 | 82 | 100 | 100 | 100 | [%] |
| Example 7 | 0 | 0 | 0 | 0 | 2 | 5 | 9 | 12 | 15 | 21 | 36 | 72 | 99 | 100 | 100 | [%] |
| Example 8 | 0.1 | 0.1 | 0.2 | 1 | 4 | 7 | 9 | 10 | 10 | 12 | 25 | 60 | 90 | 100 | 100 | [%] | particle size

| particle size | 1 | 1.5 | 2 | 3 | 4 | 6 | 8 | 12 | 16 | 24 | 32 | 48 | 64 | 96 | 128 | [μm] |
|---|---|---|---|---|---|---|---|---|---|---|---|---|---|---|---|---|
| Example 9 | 0.1 | 0.1 | 0 | 6 | 8 | 10 | 12 | 23 | 32 | 63 | 82 | 100 | 100 | 100 | 100 | [%] |
| Example 10 | 0 | 0 | 0.1 | 4 | 6 | 9 | 10 | 23 | 34 | 64 | 81 | 100 | 100 | 100 | 100 | [%] |
| Example 11 | 0 | 0 | 0 | 0 | 2 | 3 | 4 | 15 | 37 | 70 | 82 | 95 | 100 | 100 | 100 | [%] | ns
GRANULES BASED ON PYROGENICALLY PREPARED SILICON DIOXIDE, METHODS FOR THEIR PREPARATION AND USE THEREOF

INTRODUCTION AND BACKGROUND

The present invention relates to granules based on pyrogenically prepared silicon dioxide and methods for their preparation and the use thereof as catalyst supports.

The preparation of pyrogenic silicas or silicon dioxides from $SiCl_4$ by means of high-temperature or flame hydrolysis is known (Ullmanns Enzyklopädie der technischen Chemie, 4th Edition, Volume 21, page 464 (1982)). Pyrogenic silicon dioxides are distinguished by having an extremely fine particle size, high specific surface (BET) area, very high purity, spherical particle shape and the absence of pores. On account of these properties, pyrogenically prepared silicon dioxides are attracting increasing interest as supports for catalysts (Koth et al., Chem. Ing. Techn. (1980), 52: 628). For this purpose the pyrogenically prepared silicon dioxide is shaped by mechanical means, for example, using tabletting machines.

The shaping of pyrogenically prepared silicon dioxide into spray dried granules by means of spray drying to obtain a starting material for sintered ceramic materials is also known (DE 36 11 449). It is also known that silicon dioxide, pyrogenically prepared in an electric arc, may be shaped by means of spray drying into spray dried granules which can be used as adsorption media or else as catalyst supports (DE 12 09 108).

The subjection of pyrogenically prepared silicon dioxide to a gel process and the subsequent shaping into granules by means of spray drying is also known. These granules, after coating with chromium oxide, are used in the polymerization of ethylene; see EP 0 050 902, which corresponds to U.S. Pat. No. 4,386,016 which is incorporated by reference in its entirety.

Furthermore, the use of precipitated silicon dioxide as a catalyst support for the catalytic polymerization of olefins is known (WO 91/09881).

The known spray dried granules of pyrogenically prepared silicon dioxides have the disadvantage that they are not optimally suitable for use as catalyst supports, for example, in the production of polyethylene.

SUMMARY OF THE INVENTION

One object of the present invention is to obtain pyrogenically prepared silicon dioxide which can be used as catalyst supports, for example, in the production of polyethylene.

This and other objects are achieved by the present invention which provides granules based on pyrogenically prepared silicon dioxide and having the following physicochemical properties:

Average particle size: 10 to 120 μm
BET surface area: 40 to 400 m²/g
Pore volume: 0.5 to 2.5 ml/g
Pore size distribution: less than 5% of the total pore volume exists as pores with a diameter<5 nm, remainder are meso- and macropores
pH value: 3.6 to 8.5
Tapped density: 220 to 700 g/l The granular material according to the present invention can be prepared by dispersing pyrogenically prepared silicon dioxide in water, spray drying it and heating the granules obtained at a temperature of from 150° to 1,100° C. for a period of 1 to 8 hours.

Alternatively, the granular material according to the present invention can be prepared by dispersing pyrogenically prepared silicon dioxide in water, spray drying it and silanizing the granules obtained. Halosilanes, alkoxysilanes, silazanes and/or siloxanes can be used for the silanization.

BRIEF DESCRIPTION OF THE DRAWINGS

The present invention will be further understood with reference to the drawings, wherein.

DETAILED DESCRIPTION OF THE INVENTION

Figure 1A:
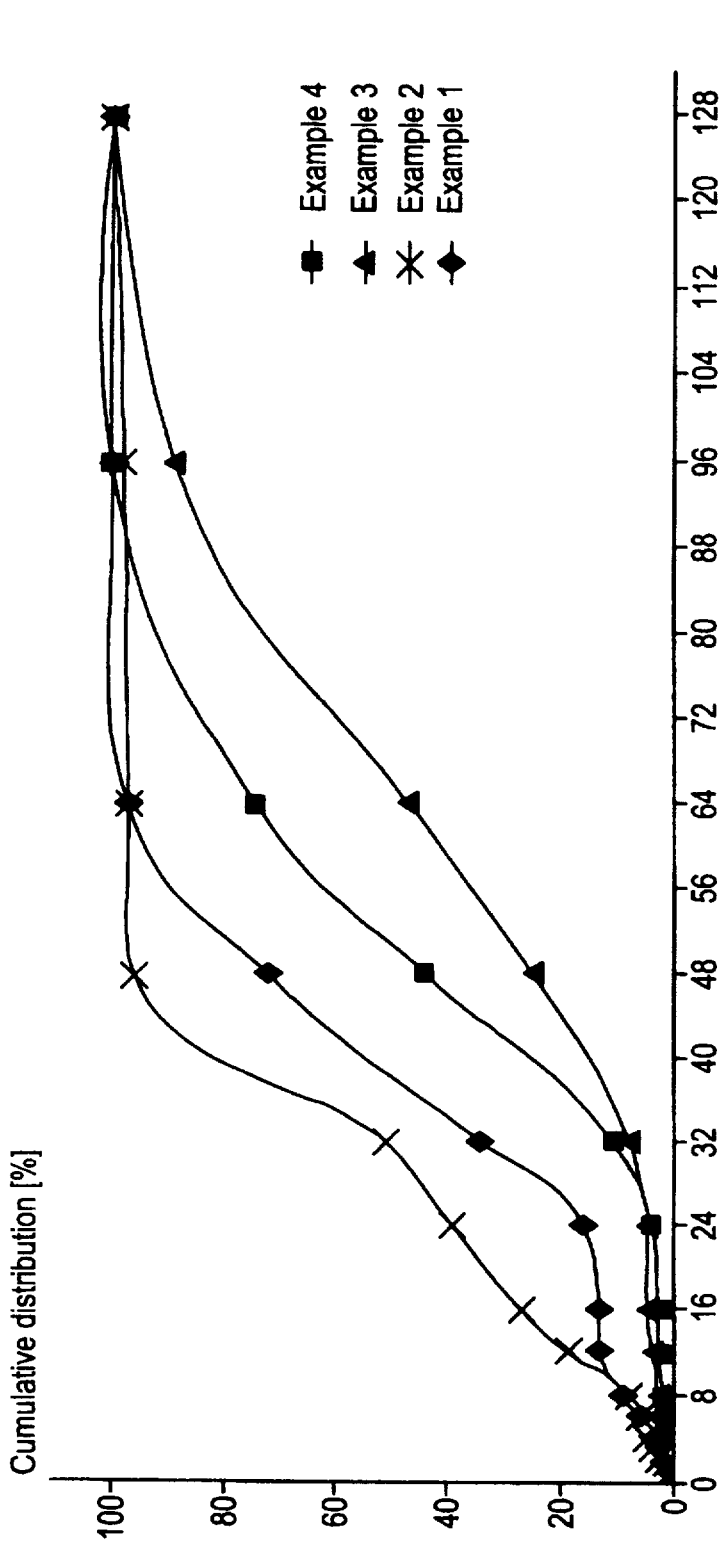
FIGS. 1–4 are a graphical depiction of the particle size distributions of the granules obtained according to Examples 1 to 14.

According to the present invention, finely divided granulates of a pyrogenically prepared silica are formed with the following characteristics:

Average particle size: 10 to 120 μm
BET surface area: 40 to 400 m²/g
Pore volume: 0.5 to 2.5 ml/g
Pore size distribution: less than 5% of the total pore volume exists as pores with a diameter<5 nm, remainder are meso- and macropores
pH value: 3.6 to 8.5
Tapped density: 220 to 700 g/l In the alternative method of preparing these substances, the following halosilanes can be used:

Haloorganosilanes of the type $X_3Si(C_nH_{2n+1})$ where X=Cl or Br and n=1 to 20.

Haloorganosilanes of the type $X_2(R')Si(C_nH_{2n+1})$ where X=Cl or Br; R'=alkyl (e.g., lower alkyl); and n=1 to 20.

Haloorganosilanes of the type $X(R')_2Si(C_nH_{2n+1})$ where X=Cl or Br; R'=alkyl (e.g., lower alkyl); and n=1 to 20.

Haloorganosilanes of the type $X_3Si(CH_2)_m$—R' where X=Cl or Br; m=0, or 1 to 20; and R'=alkyl (e.g., lower alkyl), aryl (for example, —$C_6H_5$)

—$C_4F_9$, —$OCF_2$—CHF—$CF_3$, —$C_6F_{13}$, —O—$CF_2$—$CHF_2$

—$NH_2$, —$N_3$, —SCN, —CH=$CH_2$,

—OOC($CH_3$)C=$CH_2$

—$OCH_2$—CH(O)$CH_2$

—NH—CO—N—CO—($CH_2$)$_5$

—NH—COO—$CH_3$, —NH—COO—$CH_2$—$CH_3$, —NH—($CH_2$)$_3$Si(OR)$_3$

—$S_x$—($CH_2$)$_3$Si(OR)$_3$ wherein R is a lower alkyl and x is 0 or 1.

Haloorganosilanes of the type (R)$X_2$Si($CH_2$)$_m$—R' where X=Cl or Br; R=alkyl (e.g., lower alkyl); m=0, or 1 to 20; and R'=alkyl (e.g., lower alkyl), aryl (for example, —$C_6H_5$)

—$C_4F_9$, —$OCF_2$—CHF—$CF_3$, —$C_6F_{13}$, —O—$CF_2$—$CHF_2$

—$NH_2$, —$N_3$, —SCN, —CH=$CH_2$,

—OOC($CH_3$) C=$CH_2$

—$OCH_2$—CH(O)$CH_2$

—NH—CO—N—CO—($CH_2$)$_5$

—NH—COO—$CH_3$, —NH—COO—$CH_2$—$CH_3$, —NH—($CH_2$)$_3$Si(OR)$_3$

—$S_x$—($CH_2$)$_3$Si(OR)$_3$ wherein R is a lower alkyl and x is 0 or 1.

Haloorganosilanes of the type $(R)_2XSi(CH_2)_m-R'$ where X=Cl or Br; R=alkyl (e.g., lower alkyl); m=0, or 1 to 20; and R'=alkyl (e.g., lower alkyl), aryl (for example, $-C_6H_5$)
—$C_4F_9$, —$OCF_2$—CHF—$CF_3$, —$C_6F_{13}$, —O—$CF_2$—$CHF_2$
—$NH_2$, —$N_3$, —SCN, —CH=$CH_2$,
—$OOC(CH_3)C$=$CH_2$
—$OCH_2$—$CH(O)CH_2$

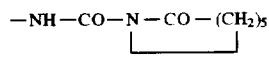

—NH—COO—$CH_3$, —NH—COO—$CH_2$—$CH_3$, —NH—$(CH_2)_3Si(OR)_3$
—$S_x$—$(CH_2)_3Si(OR)_3$ wherein R is a lower alkyl and x is 0 or 1.

The following substances in particular can be used as alkoxysilanes:

Organosilanes of the type $(RO)_3Si(C_nH_{2n+1})$ where R=alkyl (e.g., lower alkyl) and n=1 to 20.

Organosilanes of the type $R'_x(RO)_ySi(C_nH_{2n+1})$ where
R=alkyl (e.g., lower alkyl)
R=alkyl (e.g., lower alkyl)
n=1 to 20
x+y=3
x=1 or 2 and
y=1 or 2

Organosilanes of the type $(RO)_3Si(CH_2)_m-R'$ where
R=alkyl (e.g., lower alkyl)
m=0, or 1 to 20
R'=alkyl (e.g., lower alkyl), aryl (for example, $-C_6H_5$)
—$C_4F_9$, —$OCF_2$—CHF—$CF_3$, —$C_6F_{13}$, —O—$CF_2$—$CHF_2$
—$NH_2$, —$N_3$, —SCN, —CH=$CH_2$,
—$OOC(CH_3)C$=$CH_2$
—$OCH_2$—$CH(O)CH_2$

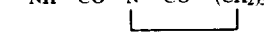

—NH—COO—$CH_3$, —NH—COO—$CH_2$—$CH_3$, —NH—$(CH_2)_3Si(OR)_3$
—$S_x$—$(CH_2)_3Si(OR)_3$ wherein R is a lower alkyl and x is 0 or 1.

Organosilanes of the type $(R'')_x(RO)_ySi(CH_2)_m-R'$ where
R''=alkyl (e.g., lower alkyl)
x+y=2
x=1 or 2
y=1 or 2
R'=alkyl (e.g., lower alkyl), aryl (for example, $-C_6H_5$)
—$C_4F_9$, —$OCF_2$—CHF—$CF_3$, —$C_6F_{13}$, —O—$CF_2$—$CHF_2$
—$NH_2$, —$N_3$, —SCN, —CH=$CH_2$
—$OOC(CH_3)C$=$CH_2$
—$OCH_2$—$CH(O)CH_2$

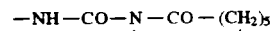

—NH—COO—$CH_3$, —NH—COO—$CH_2$—$CH_3$, —NH—$(CH_2)_3Si(OR)_3$
—$S_x$—$(CH_2)_3Si(OR)_3$ wherein R is a lower alkyl and x is 0 or 1.

Preferably the Silane Si 108, $(CH_3O)_3$—Si—$C_8H_{17}$, trimethoxyoctylsilane, is used as the silanizing agent.

The following substances in particular can be used as silazanes: Silazanes of the type

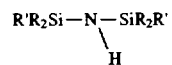

R=alkyl (e.g., lower alkyl)
R'=alkyl (e.g., lower alkyl), vinyl as well as, for example, hexamethyldisilazane.

The following substances in particular can be used as siloxanes:

Cyclic polysiloxanes of the type D 3, D 4, D 5 for example, octamethylcyclotetrasiloxane=D4

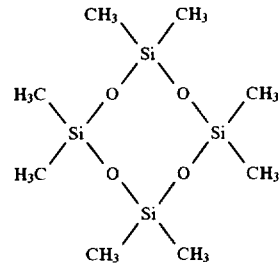

Polysiloxanes or silicone oils of the type

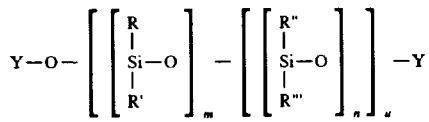

m = 0, 1, 2, 3, ... ∞
n = 0, 1, 2, 3, ... ∞
u = 0, 1, 2, 3, ... ∞
Y = $CH_3$, H, $C_nH_{2n+1}$    n = 1 to 20
Y = $Si(CH_3)_3$, $Si(CH_3)_2H$
    $Si(CH_3)_2OH$, $Si(CH_3)_2(OCH_3)$
    $Si(CH_3)_2(C_nH_{2n+1})$    n = 1 to 20

R=alkyl (e.g., lower alkyl), aryl, $(CH_2)_n$—$NH_2$, H
R'=alkyl (e.g., lower alkyl), aryl, $(CH_2)_n$—$NH_2$, H
R''=alkyl (e.g., lower alkyl), aryl, $(CH_2)_n$—$NH_2$, H
R'''=alkyl (e.g., lower alkyl), aryl, $(CH_2)_n$—$NH_2$, H where n=1–20

The invention also provides granules based on pyrogenically prepared silicon dioxide and having the following physicochemical properties:
Average particle size: 10 to 120 µm
BET surface area: 40 to 400 m²/g
Pore volume: 0.5 to 2.5 ml/g
Pore size distribution: less than 5% of the total pore volume exists of pores with a diameter<5 nm, remainder meso- and macropores
Carbon content: 0.3 to 15.0 wt. %
pH value: 3.6 to 8.5
Tapped density: 220 to 700 g/l The granular material according to the invention preferably has meso- and macropores, with the volume of the mesopores constituting 10 to 80% of the total pore volume. In a preferred embodiment of the invention, the proportion of pores smaller than 5 nm may be at most 5% referred to the total pore volume.

The carbon content of the granular material according to the invention may be from 0.3 to 15.0 wt. %.

The particle size distribution of the granular material according to the invention may be 80 vol. % larger than 8 μm and 80 vol. % smaller than 96 μm.

The granular material according to the invention can be prepared by dispersing pyrogenically prepared silicon dioxide in water, spray drying it, heating the granules obtained at a temperature of from 150° to 1,100° C. for a period of 1 to 8 hours and then silanizing them. The same halosilanes, alkoxysilanes, silazanes and/or siloxanes described above can be used for the silanization.

The invention further provides a method for the preparation of granules based on pyrogenically prepared silicon dioxide, which is characterized in that pyrogenically prepared silicon dioxide, preferably silicon dioxide prepared from silicon tetrachloride by means of flame hydrolysis, is dispersed in water, spray dried, the granules obtained are optionally heated at a temperature of from 150° to 1,100° C. for a period of 1 to 8 hours and/or silanized.

The dispersion in water can have a silicon dioxide concentration of from 5 to 25 wt. %.

The spray drying can be carried out at a temperature of from 200° to 600° C. Disc atomizers or nozzle atomizers can be used for this purpose; such equipment is known in the art.

The heating of the granules can be carried out both in fixed beds, for example chamber kilns, and in moving beds, for example rotary dryers; such equipment is known in the art.

The silanization can be carried out using the same halosilanes, alkoxysilanes, silazanes and/or siloxanes as described above, for which the silanizing agent can be optionally dissolved in an organic solvent such as, for example, ethanol.

Preferably the Silane Si 108 (($CH_3O)_3$—Si—$C_8H_{17}$), trimethoxyoctylsilane, is used as silanizing agent.

The silanization can be carried out by spraying the granular material with the silanizing agent and subsequently heat-treating the mixture at a temperature of from 105° to 400° C. over a period of 1 to 6 hours.

In an alternative method, the silanization of the granules can be carried out by treating the granular material with the silanizing agent in vapor form and subsequently heat-treating the mixture at a temperature of from 200° to 800° C. over a period of 0.5 to 6 hours.

The heat treatment can take place under a protective inert gas such as, for example, nitrogen.

The silanization can be carried out continuously or batchwise in heatable mixers and dryers equipped with spraying facilities. Examples of suitable devices are ploughshare mixers, disk dryers or fluidized bed dryers; such equipment is known in the art.

The physicochemical variables of the granules, such as the specific surface area, the particle size distribution, the pore volume, the tamped density and the silanol group concentration, the pore distribution and pH value can be altered within the specified limits by varying the starting materials and the conditions during spraying, heating and silanization; as will be apparent to those skilled in the art from the disclosure herein.

The granules according to the invention can be used as supports for polymerization catalysts, in particular as supports for catalysts for the production of polyethylene.

The granules have the advantage of possessing a high purity, a high thermostability, a low silanol group concentration, primary particles microspherical in shape and less than 5% of the total pore volume exists of pores with a diameter<5 nm.

The present invention further provides for the use of the granules as catalyst supports, in particular for the production of polymerization catalysts. In a preferred embodiment of the invention, the granules according to the invention can be used as catalyst supports for producing catalysts for the production of polyethylene.

EXAMPLES

Examples of the pyrogenically prepared silicon dioxides used are silicon dioxides having the physicochemical properties given in the following table:

|  | AEROSIL 90 | AEROSIL 130 | AEROSIL 150 | AEROSIL 200 | Aerosil 300 | AEROSIL 380 | AEROSIL OX50 |
|---|---|---|---|---|---|---|---|
| CAS Reg. Number | | | 112945-52-5 (former No.: 7631-86-9) | | | | |
| Behaviour towards water | | | hydrophilic | | | | |
| Appearance | | | loose white powder | | | | |
| Surface area BET[1] $m^2/g$ | 90 ± 15 | 130 ± 25 | 150 ± 15 | 200 ± 25 | 300 ± 30 | 380 ± 30 | 50 ± 15 |
| Average size of primary particles mm | 20 | 16 | 14 | 12 | 7 | 7 | 40 |
| Tamped density[2] Normal ware g/l | ca. 80 | ca. 50 | ca. 50 | ca. 50 | ca. 50 | ca. 50 | ca. 130 |
| Compacted ware g/l (Addition "V") | — | ca. 120 | ca. 120 | ca. 120 | ca. 120 | ca. 120 | — |
| Loss on drying[3] (2 h at 105° C.) % on leaving the supplier | <1.0 | <1.5 | <0.5[9] | <1.5 | <1.5 | <1.5 | <1.5 |
| Loss on ignition[4)7] (2 h at 1.000° C.) % | <1 | <1 | <1 | <1 | <2 | <2,5 | <1 |
| pH value[5] (in 4% aqueous dispersion) | 3.6–4.5 | 3.6–4.3 | 3.6–4.3 | 3.6–4.3 | 3.6–4.3 | 3.6–4.3 | 3.6–4.3 |
| $SiO_2$[8] % | >99.8 | >99.8 | >99.8 | >99.8 | >99.8 | >99.8 | >99.8 |
| $Al_2O_3$[8] % | <0.05 | <0.05 | <0.05 | <0.05 | <0.05 | <0.05 | <0.08 |
| $Fe_2O_3$[8] % | <0.003 | <0.003 | <0.003 | <0.003 | <0.003 | <0.003 | <0.01 |
| $TiO_2$[8] % | <0.03 | <0.03 | <0.03 | <0.03 | <0.03 | <0.03 | <0.03 |
| HCl[8)11] % | <0.025 | <0.025 | <0.025 | <0.025 | <0.025 | <0.025 | <0.025 |

| | AEROSIL 90 | AEROSIL 130 | AEROSIL 150 | AEROSIL 200 | Aerosil 300 | AEROSIL 380 | AEROSIL OX50 |
|---|---|---|---|---|---|---|---|
| Screen oversize[6] (by Mocker, 45 μm) % | <0.05 | <0.05 | <0.05 | <0.05 | <0.05 | <0.05 | 0.2 |

[1] In accordance with DIN 66131
[2] In accordance with DIN ISO 787/XI, JIS K 5101/18 (not screened)
[3] In accordance with DIN ISO 787/II, ASTM D 280, JIS K 5101/21
[4] In accordance with DIN 55921, ASTM D 1208, JIS K510/123
[5] In accordance with DIN ISO 787/IX, ASTM D 1208, JIS K 5101/24
[6] In accordance with DIN ISO 787/XVIII, JIS K510/20
[7] Referred to the substance dried for 2 hours at 105° C.
[8] Referred to the substance calcined for 2 hours at 1000° C.
[9] Special moisture-resistant packaging
[10] In water:ethanol 1:1
[11] HCl content in constituent of the loss on ignition To prepare the silicon dioxides, a liquid silicon compound is sprayed into an oxyhydrogen flame consisting of hydrogen and air. In most cases silicon tetrachloride is used. This substance is hydrolyzed to silicon dioxide and hydrochloric acid by the action of the water formed during the hydrogen-oxygen reaction. After leaving the flame, the silicon dioxide enters a so-called coagulation zone, wherein the primary Aerosil® particles and primary Aerosil® aggregates agglomerate. The product, which exists at this stage as a kind of aerosol, is separated from the accompanying gaseous substances in cyclones and then aftertreated with moist heated air.

By this process the residual hydrochloric acid content can be lowered to 0.025%. As the silicon dioxide obtained at the end of this process has a bulk density of only about 15 g/l, there is a subsequent vacuum compaction whereby tamped densities of about 50 g/l and more can be established.

The particle sizes of the silicon dioxides can be varied by means of the reaction conditions such as, for example, flame temperature, proportions of hydrogen and oxygen, quantity of silicon tetrachloride, residence time in the flame or length of the coagulation path; as will be apparent to those skilled in the art from the disclosure herein.

The BET surface area is determined using nitrogen in accordance with DIN (German Industrial Standard) 66 131.

The pore volume is calculated from the sum of the micro-, meso- and macropore volumes. The micro- and mesopores are determined by recording an $N_2$ isotherm and evaluation thereof by the methods of BET (de Boer and Barrett, Joyner and Halenda). The macropores D>30 nm are determined by the Hg porosimetry method. For the determination of the macropores, the sample is dried for 15 hours at 100° C. in the drying oven and degassed at room temperature in a vacuum. For the determination of the micro- and mesopores, the sample is dried for 15 hours at 100° C. in the drying oven and degassed for 1 hour at 200° C. in a vacuum. Such methods are well known in the art.

The silanol group concentration is determined by the lithium alanate method known in the art. Here the SiOH— groups are reacted with $LiAlH_4$ and the quantity of hydrogen formed during this reaction is determined from the pressure.

Principle of Measurement

The granular material is weighed into a four-necked flask. The flask is evacuated and an oil bath is heated to 150° C. The temperature in the flask (controlled by an internal thermometer) rises with the temperature of the oil bath to about 130° C. The pressure during the preliminary treatment is recorded using a pressure measuring device $PI_2$ (TM 210, from Leybold, measuring range $10^3$ to $10^{-3}$ mbar). The desorption of the water can be monitored from the pressure measurement. At the end of the preliminary treatment (30 min at the end temperature) a pressure of less than $10^{-2}$ mbar must have been achieved.

After completion of the preliminary treatment, the evacuated flask is separated from the vacuum unit by closing the stop valve and is brought to normal temperature. The actual measurement is based on a measured quantity of $LiAlH_4$ solution being introduced into the flask through the dropping funnel and the rise in pressure being measured from the hydrogen formed. If the volume of the flask is known, the quantity of $H_2$ can be calculated from the ideal gas law. The pressure is recorded using a digital measuring device ($PI_1$) (MKS Instruments PR-2000), having a measuring range of between 0 and 1 bar.

The $LiAlH_4$ solution used (2% $LiALH_4$ in diethylene glycol dimethyl ether) is degassed prior to the experiment being carried out in order to remove readily volatile constituents which distort the pressure measurement. For this purpose the pressure above the solution in the dropping funnel is lowered by a second vacuum pump to the vapor pressure (3.7 mbar at 22° C.) so that the liquid boils. A blank measurement without a sample is taken to test whether the solution is sufficiently degassed. In the determination of the hydrogen pressure, a correction is made using the vapor pressure of the solvent.

Interpretation

The apparatus is calibrated by first of all determining the volume of the dropping funnel provided with a ground-glass stopper, gauging the capacity in liters. The volume of the reaction flask inclusive of all connections as far as the stop valve is obtained by the following experiment:

The dropping funnel, filled with air at atmospheric pressure, is attached to the evacuated flask. A pressure compensation between the two volumes is then brought about by opening the tap of the dropping funnel. The pressure established is indicated by the digital measuring device. The volume of the reaction vessel is obtained from the mass balance. A volume $V_R$ equal to 243.8 ml is obtained with the present arrangement.

The number of moles of hydrogen formed is obtained from the equations:

$$n = \frac{p \cdot V(corr.)}{RT}$$

p is the increase in pressure in the reaction flask. This value is corrected by an amount corresponding to the vapor pressure of the solvent (3.7 mbar at 22° C.). At room temperatures greatly differing from 22° C. the vapor pressure is taken from the vapor pressure table. It is useful to select the weighed sample so that a value for p of between 200 and 800 mbar is obtained. In this case minor changes in the vapor pressure owing to temperature variations have hardly any effect on the result.

The volume of the reaction vessel is corrected by deducting the volume of solid matter and the volume of the solution introduced. The former is given from the weighed portion and the density and the latter is read from the dropping funnel.

The density of silanol groups is finally obtained from the equation:

$$d = \frac{n \cdot N_L}{F}$$

The samples are treated as follows: 1 hour heating at 120° C. and 0.2 mbar; cooling to 60° C.; addition of $LiAlH_4$; after 10 minutes, reading the pressure difference which has arisen.

The particle size distribution is determined by means of the laser optical particle size analyzer Cilas Granulametre 715.

The tapped volume is determined in accordance with ASTM D 4164–88.

Equipment

Tapping volumeter STA V 2003 from Engelsmann, in accordance with DIN 53194, section 5.2. b–f. Measuring cylinder 250 ml, graduation marks every 2 ml. Balance with limit of error of max. ±0.1 g.

Procedure

The counter of the tapping volumometer is set to 1000 strokes. The measuring cylinder is tared. The granular material is placed in the measuring cylinder up to the 250 ml mark. The weight of the sample is recorded (±0.1 g). The measuring cylinder is placed in the volumeter and the apparatus is switched on. End of tapping: the apparatus automatically switches off after 1000 strokes. The tapped bulk volumes are read to an accuracy of 1 ml.

Calculation

E: weighed portion of granular material in g
V: volume read in ml
W: water content in wt. % (determined in accordance with Specification P001)

$$\text{Tapped density} = \frac{E \times (100 - W)}{V \times 100}$$

The pH value is determined in 4% aqueous dispersion, in the case of hydrophobic catalyst supports in water:ethanol 1:1.

Preparation of the Granules According to the Invention

The pyrogenically prepared silicon dioxide is dispersed in completely demineralized water. A dispersing aggregate which operates according to the rotor/stator principle is used in the process. The suspensions formed are spray dried. The finished product is precipitated by a filter or cyclone.

The sprayed granules are heated in a muffle furnace.

The spray-dried and optionally heated granules are placed in a mixer for the silanization process and sprayed with intensive mixing optionally first of all with water and then with the Silane Si 108 (trimethoxyoctylsilane) or HMDS (hexamethyldisilazane). After spraying has been completed, the material is mixed for 15 to 30 more minutes and then heated for 1 to 4 hours at 100° to 400° C.

The water used can be acidified with an acid, for example, hydrochloric acid, to a pH value of 7 to 1. The silanizing agent used can be dissolved in an inert organic solvent such as, for example, ethanol.

| Example | Comparison 1 | 2 | 3 | 4 | Comparison 5 |
|---|---|---|---|---|---|
| Starting Aerosil | 380 | 380 | 380 | 380 | 380 |
| Data for spray drying | | | | | |
| Quantity of $H_2O$ (kg) | 10 | 10 | 105 | 105 | 15 |
| Quantity of Aerosil (kg) | 1.5 | 1.5 | 14.7 | 14.7 | 1.5 |
| Atomisation using | Disc | Disc | Disc | Disc | Disc |
| Operating temperature (°C.) | 380 | 380 | 380 | 440 | 380 |
| Exhaust air temperature (°C.) | 105 | 105 | 105 | 108 | 105 |
| Precipitation | Filter | Filter | Filter | Filter | Cyclone |
| Data for heating (h/°C.) | — | — | 2/700 | 2/700 | — |
| Data for the modification of the surface | | | | | |
| Reagent | — | Si 108 | Si 108 | HMDS | — |
| Quantity [g/100 g Aerosil] | — | 25 | 25 | 20 | — |
| Quantity of water [g/100 g Aerosil] | — | — | 5 | 5 | — |
| Heating time (h) | — | 2 | 2 | 4 | — |
| Temperature (°C.) | — | 120 | 120 | 140 | — |
| Physicochemical properties | | | | | |
| BET surface area ($m^2/g$) | 350 | 197 | 189 | 212 | 277 |
| Pore volume (ml/g) | 2.09 | 1.69 | 1.55 | 1.68 | 1.69 |
| Pore volume (% of total pore volume) in pores < 5 nm | n.d. | 1.8 | n.d. | n.d. | n.d. |
| Mesopores 2–30 nm (ml/g) | 1.34 | 1.04 | 1.12 | 1.17 | 0.66 |

-continued

| | | | | | |
|---|---|---|---|---|---|
| Makropores > 30 nm (ml/g) | 0.75 | 0.65 | 0.43 | 0.51 | 1.03 |
| Particle size $d^{50}$ (μm) | 38 | 40 | 66 | 53 | 39 |
| Tapped density (g/l) | 320 | 390 | 420 | 370 | 260 |
| pH value | 4.7 | 5.0 | 5.6 | 7.2 | 4.8 |
| Carbon content % | — | 10.9 | 10.4 | 3.8 | — |
| Silanol group concentration (mmol OH/g) | 1.80 | 1.18 | 0.74 | 0.37 | 1.50 |

| Example | 6 | 7 | 8 | Comparison 9 | 10 |
|---|---|---|---|---|---|
| Starting Aerosil | 300 | 300 | 300 | 0 × 50 | 0 × 50 |
| Data for spray drying | | | | | |
| Quantity of $H_2O$ (kg) | 15 | 105 | 105 | 10 | 10 |
| Quantity of Aerosil (kg) | 1.5 | 14.7 | 14.7 | 1.5 | 1.5 |
| Atomisation using | Disc | Single nozzle | Double nozzle | Disc | Disc |
| Operating temperature (°C.) | 380 | 440 | 440 | 380 | 380 |
| Exhaust air temperature (°C.) | 105 | 108 | 108 | 105 | 105 |
| Precipitation | Cyclone | Filter | Filter | Cyclone | Cyclone |
| Data for heating (h/°C.) | | | 2/700 | | |
| Data for the modification of the surface | | | | | |
| Reagent | HMDS | Si 108 | HMDS | — | HMDS |
| Quantity [g/100 g Aerosil] | 15 | 25 | 20 | — | 3 |
| Quantity of water [g/100 g Aerosil] | 5 | 5 | 5 | — | — |
| Heating time (h) | 4 | 2 | 4 | — | 5 |
| Temperature (°C.) | 140 | 120 | 140 | — | 140 |
| Physicochemical properties | | | | | |
| BET surface area (m²/g) | 222 | 180 | 195 | 46 | 41 |
| Pore volume (ml/g) | 1.79 | 1.49 | 1.51 | 0.73 | 0.68 |
| Pore volume (% of total pore volume) in pores < 5 nm | n.d. | 1.7 | 1.5 | n.d. | 1.2 |
| Mesopores 2–30 nm (ml/g) | 0.78 | 0.60 | 0.60 | 0.08 | 0.09 |
| Makropores > 30 nm (ml/g) | 1.01 | 0.89 | 0.91 | 0.65 | 0.59 |
| Particle size $d^{50}$ (μm) | 32 | 40 | 43 | 21 | 21 |
| Tapped density (g/l) | 290 | 320 | 300 | 540 | 570 |
| pH value | 6 | 5.2 | 6.9 | 5.3 | 7.4 |
| Carbon content % | 2.7 | 9.3 | 3.3 | — | 0.5 |
| Silanol group concentration (mmol OH/g) | 0.61 | 1.15 | 0.40 | 0.29 | 0.14 |

| Example | Comparison 11 | 12 | Comparison 13 | 14 |
|---|---|---|---|---|
| Starting Aerosil | 130 | 130 | 200 | 200 |
| Data for spray drying | | | | |
| Quantity of $H_2O$ (kg) | 15 | 115 | 15 | 15 |
| Quantity of Aerosil (kg) | 1.5 | 1.5 | 1.5 | 1.5 |
| Atomisation using | Disc | Disc | Disc | Disc |
| Operating temperature (°C.) | 380 | 380 | 380 | 380 |
| Exhaust air temperature (°C.) | 105 | 105 | 105 | 105 |
| Precipitation | Cyclone | Cyclone | Cyclone | Cyclone |
| Data for heating (h/°C.) | — | — | — | — |
| Data for the modification of the surface | | | | |
| Reagent | — | HMDS | — | HMDS |
| Quantity [g/100 g Aerosil] | — | 5 | — | 7 |
| Quantity of water [g/100 g Aerosil] | — | — | — | — |
| Heating time (h) | — | 5 | — | 5 |
| Temperature (°C.) | — | 140 | — | 140 |
| Physicochemical properties | | | | |
| BET surface area (m²/g) | 131 | 111 | 196 | 153 |
| Pore volume (ml/g) | 1.92 | 1.62 | 2.25 | 2.04 |
| Pore volume (% of total pore volume) in pores < 5 nm | n.d. | 1.7 | n.d. | 0.9 |
| Mesopores 2–30 nm (ml/g) | 0.24 | 0.24 | 0.46 | 0.47 |
| Makropores > 30 nm (ml/g) | 1.68 | 1.38 | 1.79 | 1.57 |

-continued

| | | | | |
|---|---|---|---|---|
| Particle size d⁵⁰ (μm) | 20 | 20 | 14 | 14 |
| Tapped density (g/l) | 250 | 280 | 230 | 240 |
| pH value | 4.8 | 7.3 | 4.8 | 7.2 |
| Carbon content % | — | 1.3 | — | 1.7 |
| Silanol group concentration (mmol OH/g) | 0.83 | 0.44 | 1.16 | 0.56 |

Figure 1B:
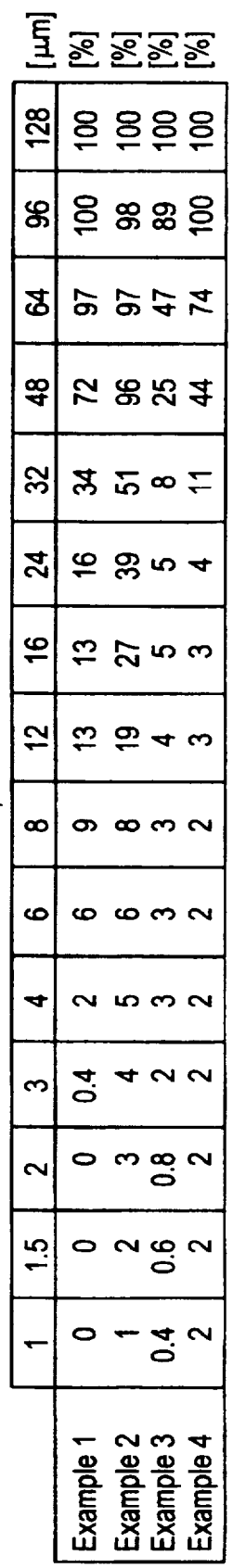
Figures 2A, 2B:
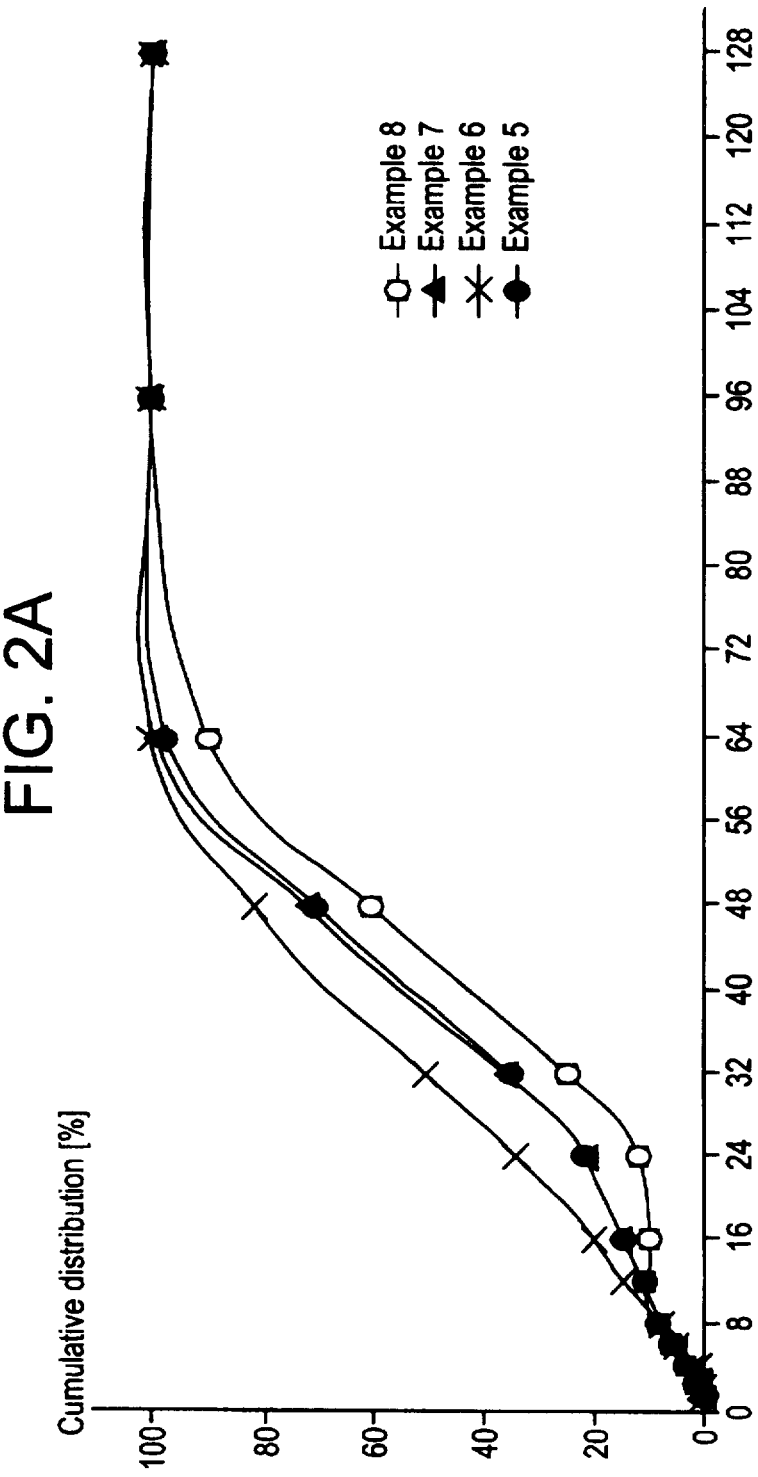
Figure 3A:
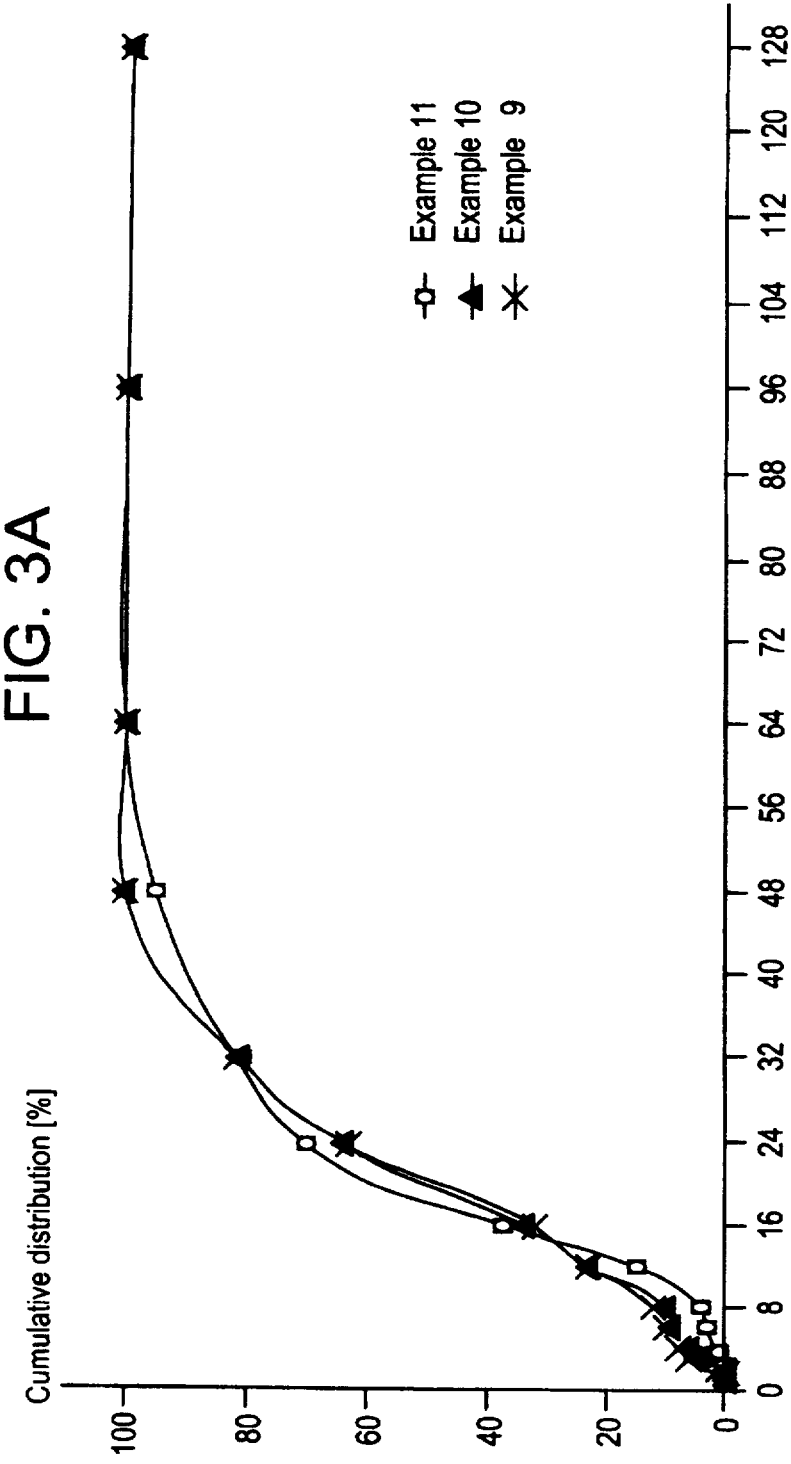
Figure 3B:
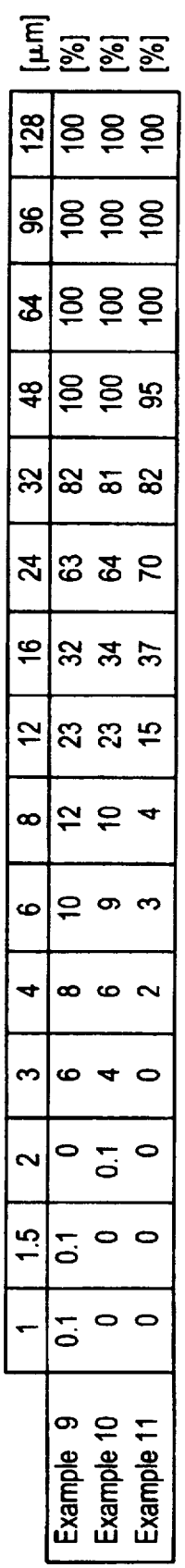
Figure 4A:
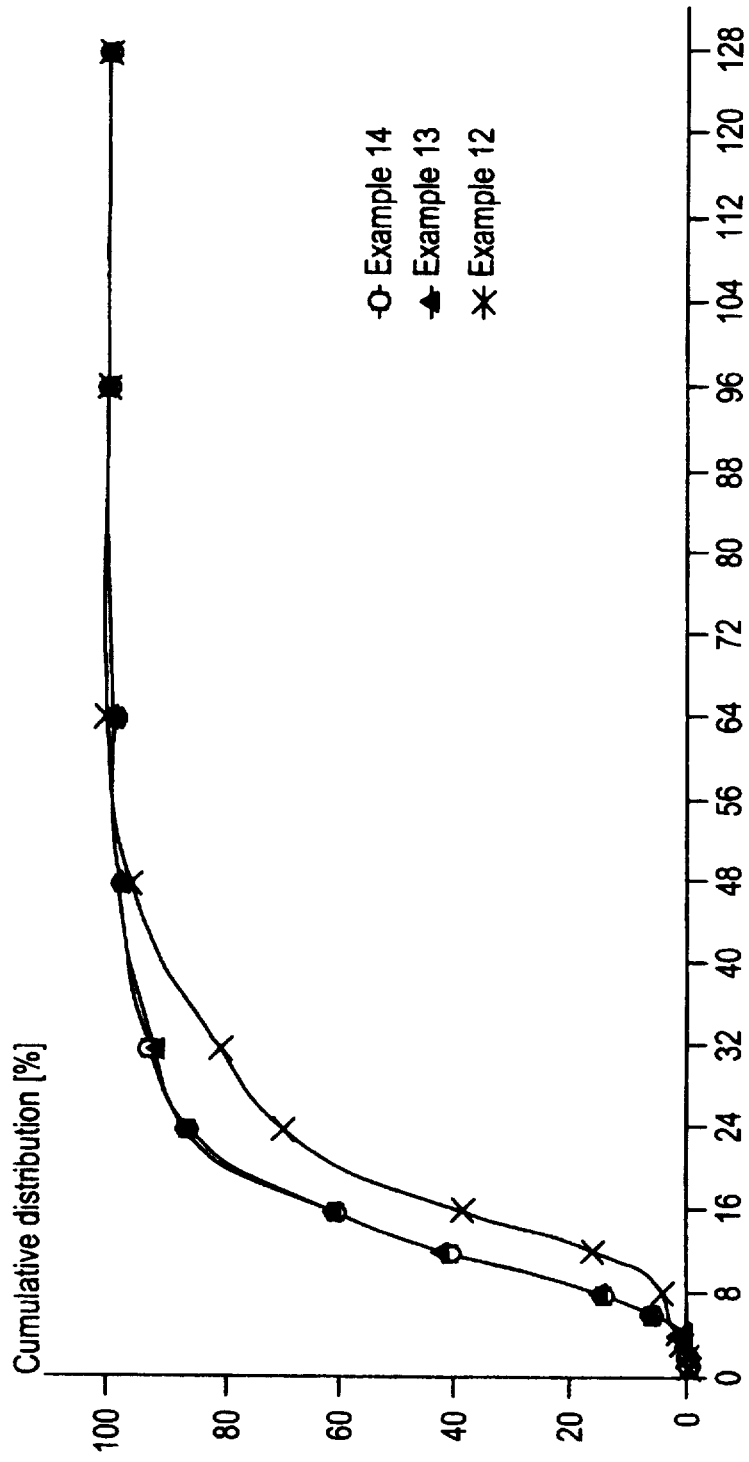
Figure 4B:
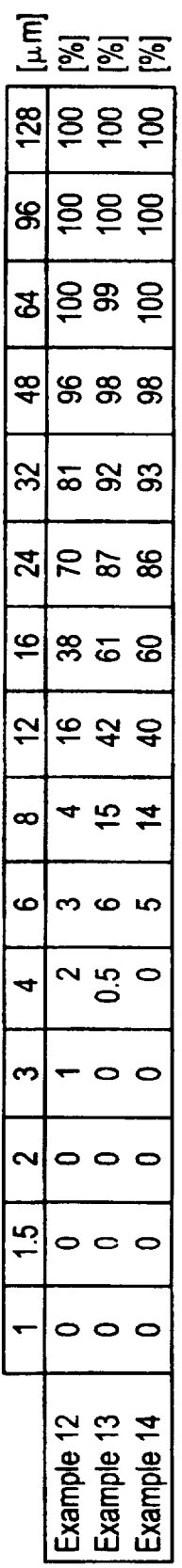

The particle size distributions of the granules obtained according to Examples 1 to 14 are represented in tabular and graphical form in FIGS. 1 to 4.

Examples 1, 5, 9, 11 and 13 are comparative Examples from prior art (DE-A 36 11 449 Liu).

Examples of the Use of the Granules According to the Invention as Catalyst Supports in the Production of Polyethylene Referred to the active component titanium, the catalysts achieved the following results in the polymerization of ethylene:

| Catalyst on a support Example | Yield kg PE/g Ti | Comment |
|---|---|---|
| Example 1 (comparative) | 292 | Only spray-dried support as in Example 1 |
| Example 2 | 360 | Chemically treated support as in Example 4 |
| Example 3 | 376 | Heat-treated and chemically treated support as in Example 6 |

Further variations and modifications of the foregoing will be apparent to those skilled in the art and such variations and modifications are intended to be encompassed by the claims that are appended hereto.

German Priority Application 195 03 717.0 filed on 4 Feb. 1995 and German Priority Application 196 01 415.8 filed on 17 Jan. 1996 are relied on and incorporated by reference in their entirety.

We claim:

1. Granules based on pyrogenically prepared silicon dioxide and having the following physicochemical properties:

Average particle size: 10 to 120 μm

BET surface area: 40 to 400 m²/g

Pore volume: 0.5 to 2.5 ml/g

Pore size distribution: less than 5% of the total pore volume exists as pores with a diameter<5 nm, remainder meso- and macropores pH value: 3.6 to 8.5

Tapped density: 220 to 700 g/l.

2. The granules according to claim 1, wherein said mesopores are 10 to 80% of the total pore volume.

3. The granules according to claim 1, wherein the particle size distribution of said granules is 80 vol. % larger than 8 μm and 80 vol. % smaller than 96 μm.

4. The granules according to claim 1, wherein the carbon content is 0.3 to 15.0 wt. %.

5. A method for the preparation of granules based on pyrogenically prepared silicon dioxide according to claim 1, comprising forming an aqueous dispersion consisting of a pyrogenically prepared silicon dioxide in water, spray drying said aqueous dispersion, and optionally heating the granules obtained at a temperature of from 150° C. to 1,100° C. for a period of 1 to 8 hours and/or silanizing with a silanizing agent.

6. The method according to claim 5, said method comprising heating the granules obtained at a temperature of from 150° to 1,100° C. for a period of 1 to 8 hours without silanizing.

7. The method according to claim 5, said method comprising silanizing the granules obtained without heating the granules at a temperature of from 150° to 1,100° C. for a period of 1 to 8 hours.

8. The method according to claim 5, comprising heating the granules obtained at a temperature of from 150° to 1,100° C. for a period of 1 to 8 hours and subsequently silanizing.

9. The method according to claim 5, wherein said spray drying is at a temperature of from 200° to 600° C.

10. The method according to claim 5, wherein said silanizing is followed by heat-treating at a temperature of from 105° to 400° C. for 1 to 6 hours.

11. The method according to claim 5, wherein said silanizing is followed by heat-treating at a temperature of from 200° to 800° C. for 0.5 to 6 hours.

12. The method according to claim 5, wherein said silanizing agent is selected from the group consisting of (a) a haloorganosilane selected from the group consisting of (i) $X_3Si(C_nH_{2n+1})$ where X=Cl or Br and n=1 to 20, (ii) $X_2(R')Si(C_nH_{2n+1})$ where X=Cl or Br, R'=alkyl, and n=1 to 20, (iii) $X(R')_2Si(C_nH_{2n+1})$ where X=Cl or Br, R'=alkyl, and n=1 to 20, (iv) $X_3Si(CH_2)_m$—R' where X=Cl or Br, m=0, or 1 to 20, R'=alkyl, aryl

—$C_4F_9$, —$OCF_2$—CHF—$CF_3$, —$C_6F_{13}$, —O—$CF_2$—$CHF_2$

—$NH_2$, —$N_3$, —SCN, —CH=$CH_2$,

—$OOC(CH_3)C$=$CH_2$

—$OCH_2$—CH(O)$CH_2$

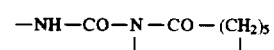

—NH—COO—$CH_3$, —NH—COO—$CH_2$—$CH_3$, —NH—$(CH_2)_3Si(OR)_3$

—$S_x$—$(CH_2)_3Si(OR)_3$ wherein R is a lower alkyl and x is 0 or 1.

(v) $(R)X_2Si(CH_2)_m$ —R' where X=Cl or Br, R=alkyl, m=0, or 1 to 20, and R'=alkyl, aryl,

—$C_4F_9$, —$OCF_2$—CHF—$CF_3$, —$C_6F_{13}$, —O—$CF_2$—$CHF_2$

—$NH_2$, —$N_3$, —SCN, —CH=$CH_2$,

—OOC (CH₃) C=CH₂
—OCH₂—CH(O)CH₂

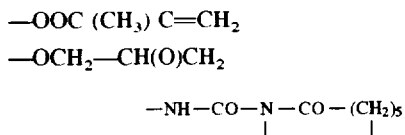

—NH—COO—CH₃, —NH—COO—CH₂—CH₃,
—NH—(CH₂)₃Si(OR)₃

—S$_x$—(CH₂)₃Si(OR)₃ wherein R is a lower alkyl and x is 0 or 1.

(vi) (R)₂XSi(CH₂)$_m$—R' where X=Cl or Br, R=alkyl, m=0, or 1 to 20; and R'=alkyl, aryl,

—C₄F₉, —OCF₂—CHF—CF₃, —C₆F₁₃, —O—CF₂—CHF₂

—NH₂, —N₃, —SCN, —CH=CH₂,

—OOC (CH₃) C=CH₂

—OCH₂—CH (O) CH₂

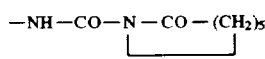

—NH—COO—CH₃, —NH—COO—CH₂—CH₃,
—NH—(CH₂)₃Si(OR)₃

—S$_x$—(CH₂)₃Si(OR)₃ wherein R is a lower alkyl and x is 0 or 1;

(b) a alkoxysilane selected from the group consisting of
(i) (RO)₃Si(C$_n$H$_{2n+1}$) where R=alkyl and n=1 to 20,
(ii) R'$_x$(RO)$_y$Si(C$_n$H$_{2n+1}$) where R=alkyl, R'=alkyl, n=1 to 20, x+y=3, x=1 or 2 and y=1 or 2,
(iii) (RO)₃Si(CH₂)$_m$—R' where R=alkyl, m=0, or 1 to 20, R'=alkyl, aryl,

—C₄F₉, 13 OCF₂—CHF—CF₃, —C₆F₁₃, —O—CF₂—CHF₂

—NH₂, —N₃, —SCN, —CH=CH₂,

—OOC(CH₃) C=CH₂

—OCH₂—CH (O) CH₂

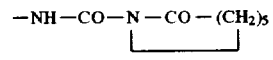

—NH—COO—CH₃, —NH—COO—CH₂—CH₃,
—NH—(CH₂)₃Si(OR)₃

—S$_x$—(CH₂)₃Si(OR)₃ wherein R is a lower alkyl and x is 0 or 1.

(iv) (R")$_x$(RO)$_y$Si(CH₂)$_m$—R" where R"=alkyl, x+y=2, x=1 or 2, y=1 or 2, R'=alkyl, aryl,

—C₄F₉, —OCF₂—CHF—CF₃, —C₆F₁₃, —O—CF₂—CHF₂,

—NH₂—N₃, —SCN, —CH=CH₂,

—OOC(CH₃)C=CH₂
—OCH₂—CH(O)CH₂

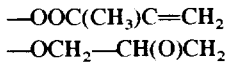

—NH—COO—CH₃, —NH—COO—CH₂—CH₃,
—NH—(CH₂)₃Si(OR)₃

—S$_x$—(CH₂)₃Si(OR)₃ wherein R is a lower alkyl and x is 0 or 1.

(c) silazane having the formula R'R₂Si—N—SiR₂R' H R=alkyl, R'=alkyl, vinyl, (d) octamethylcyclotetrasiloxane

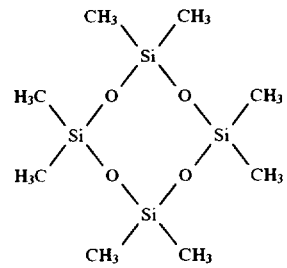

and (e) polysiloxane or silicone oils having the formula $$Y-O-\left[\left[\begin{array}{c}R\\|\\Si-O\\|\\R'\end{array}\right]_m - \left[\begin{array}{c}R''\\|\\Si-O\\|\\R'''\end{array}\right]_n\right]_u -Y$$

m = 0, 1, 2, 3, ... ∞
n = 0, 1, 2, 3, ... ∞
u = 0, 1, 2, 3, ... ∞

Y = CH₃, H, C$_n$H$_{2n+1}$   n = 1 to 20
Y = Si(CH₃)₃, Si(CH₃)₂H
    Si(CH₃)₂OH, Si(CH₃)₂(OCH₃)
    Si(CH₃)₂(C$_n$H$_{2n+1}$)   n = 1 to 20

R=alkyl, aryl, (CH₂)$_n$—NH₂, H, R'=alkyl, aryl, (CH₂)$_n$—NH₂, H, R"=alkyl, aryl, (CH₂)$_n$—NH₂, H, R'"=alkyl, aryl, (CH₂)$_n$—NH₂, H, where n=1–20.

13. The method according to claim 12, wherein said silanizing agent is (CH₃O)₃—Si—C₈H₁₇ or hexamethyldisilazane.

14. A catalyst comprising the granules according to claim 1 having deposited thereon a catalytically active substance.

15. A method for polymerizing ethylene comprising carrying out the polymerization of ethylene in the presence of a catalyst comprising the granules according to claim 1 having deposited thereon a catalytically active substance capable of polymerizing said ethylene to form polyethylene.

16. Granules of pyrogenically prepared silicon dioxide produced by the method of claim 5.

* * * * *